United States Patent [19]

Lin

[11] Patent Number: 4,739,949
[45] Date of Patent: Apr. 26, 1988

[54] WHEEL LOCKS FOR VIDEO TAPE CASSETTES

[76] Inventor: Long-Jin Lin, N0. 53 Yih Yeong Rd., 80257 Lin Ya Dist, Kaohsiung, Taiwan

[21] Appl. No.: 920,469

[22] Filed: Oct. 20, 1986

[51] Int. Cl.⁴ ............................................. G11B 15/32
[52] U.S. Cl. ..................................... 242/198; 360/132
[58] Field of Search ............... 242/197, 198, 199, 200; 360/132

[56] References Cited

U.S. PATENT DOCUMENTS

| | | | |
|---|---|---|---|
| 4,513,928 | 4/1985 | Hackett | 360/132 X |
| 4,553,717 | 11/1985 | Takagi | 242/199 X |
| 4,579,295 | 4/1986 | Harada | 242/198 |
| 4,585,187 | 4/1986 | Okamura et al. | 242/198 |
| 4,621,779 | 11/1986 | Fitterer et al. | 242/199 |
| 4,633,355 | 12/1986 | Harada | 242/198 X |
| 4,650,136 | 3/1987 | Tsuruta | 242/198 |

Primary Examiner—Stuart S. Levy
Assistant Examiner—Joseph J. Hail, III
Attorney, Agent, or Firm—Kirschstein, Kirschstein, Ottinger & Israel

[57] ABSTRACT

An improved wheel lock for a video tape cassette is molded as one whole unit (part) of a flexible and elastic plastic material. This single part can effectively prevent the wheels of the tape cassette from free rotation or make it rotate freely, which is conventionally effected by the interaction of five units (parts). This single unit is easy to manufacture, low in its cost and accurate in its action.

9 Claims, 3 Drawing Sheets and the projections 111 at the ends of the fixing wings 11 will consequently be pulled out of the serration notches of the tape wheels 3, permitting the tape wheels 3 to rotate freely.

WHEEL LOCKS FOR VIDEO TAPE CASSETTES

BACKGROUND OF THE INVENTION

1. Field of the Invention

This invention relates to locking mechanisms for tape cassettes.

2. Description of the Prior Art

The method used to prevent conventional video tape cassette wheels from rotating while not working is dependent on serrations around the peripheries of the tape wheels, a moving unit that can be inclinedly moved only upwards, two fixing arms that can be moved by said moving unit and two springs set respectively on said fixing arms for automatically pushing back said fixing arms. When the tape cassette is not put into the tape recorder or the rewinder, the moving unit stays at the normal position and the fixing arms, by means of their springs, mesh with the serrations of the tape wheels preventing the tape wheels from idle rotation. On the contrary, when the tape cassette is put into a recorder or a rewinder, the lifting rod of the recorder or the rewinder will push the moving unit upwards, and the fixing arms, being moved by the moving unit, are caused to be separated from the serrations of the tape wheels so that the tape wheels may be set loose for free rotation.

However, the above mentioned design of conventional locking tape wheels still has the disadvantages listed as follows.

1. The locking design for the cassette wheels is based on mutual movement among five parts interconnected by a passive and indirect transmission. They perform a double-armed synchronous action which causes their complicated structure, and their production cost runs high because five parts need separate molds in manufacture.
2. The operational action is not quite accurate because of its indirect action operated by five parts used in a round-about transmission.
3. Since each of the fixing arms performs an independent synchronous action, if either of the two springs is fatigued or out of order, the fixing capability will be lost immediately.

Conclusively, the conventional locking mechanism for a video tape cassette is not only complicated in structure but has a high cost, because it includes quite a few of parts which are rather complicated in manufacture and are easy to get lost owing to their small sizes and have a high percentage of malfunctioning. Besides, their actions are not direct. Therefore it is necessary to improve such a tape cassette for both manufacturers and users.

SUMMARY OF THE INVENTION

This invention makes use of a one-piece locking base with double wings to directly lock or release tape wheels in a video tape cassette.

DETAILED DESCRIPTION OF THE PREFERRED EMBODIMENT

Figure 1:
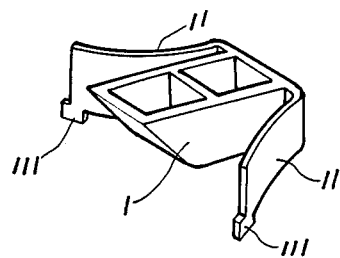
FIG. 1 is a front perspective view of the locking base of this invention.
Figure 2:
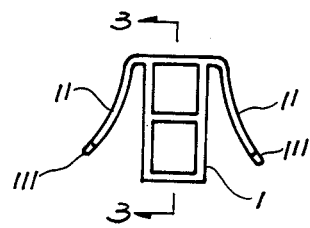
FIG. 2 is a top view of the locking base of FIG. 1.
Figure 3:
FIG. 3 is a cross-sectional view of the locking base taken on line 3—3 of FIG. 2.
Figure 7:
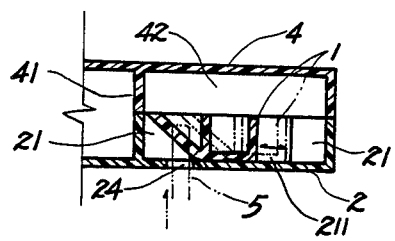
FIG. 7 is a cross sectional view of the upper cover, the lower cover and the locking base showing movement of the latter.

As shown in FIGS. 1, 2, 3, this invention, a double-winged locking base 1, is molded as one unit (part) of flexible elastic plastic material. The front bottom edge of the locking base 1 is shaped as an inclined surface which is convenient for a pushing rod 5 (see FIG. 7) in a tape recorder or a rewinder to push back the locking base 1. Two sides of the back edge of the locking base 1 are respectively connected with a fixing wing 11 that extends outwards smoothly in a certain curve. The bottom of the end of each fixing wing 11 has a projection 111 which is to lock in a notch of the serrations positioned peripherally around the tape wheels 3.

Figure 4:
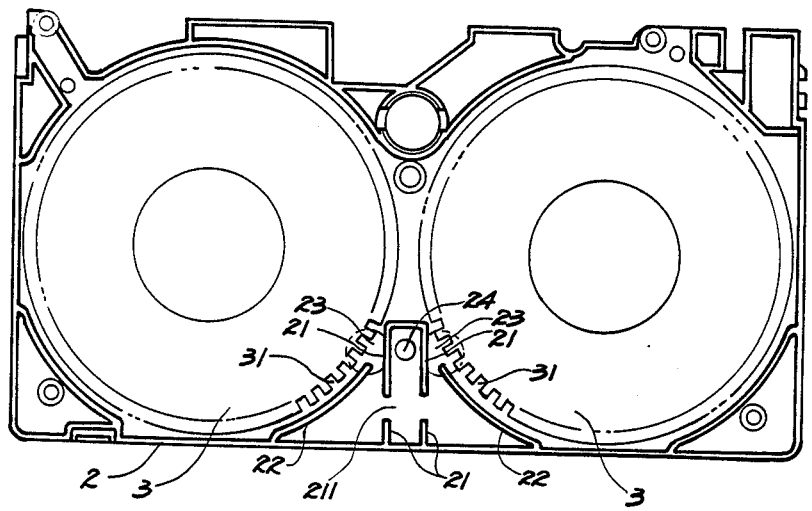
FIG. 4 is a top view of the lower cover of a tape cassette used with this invention.
Figure 6:
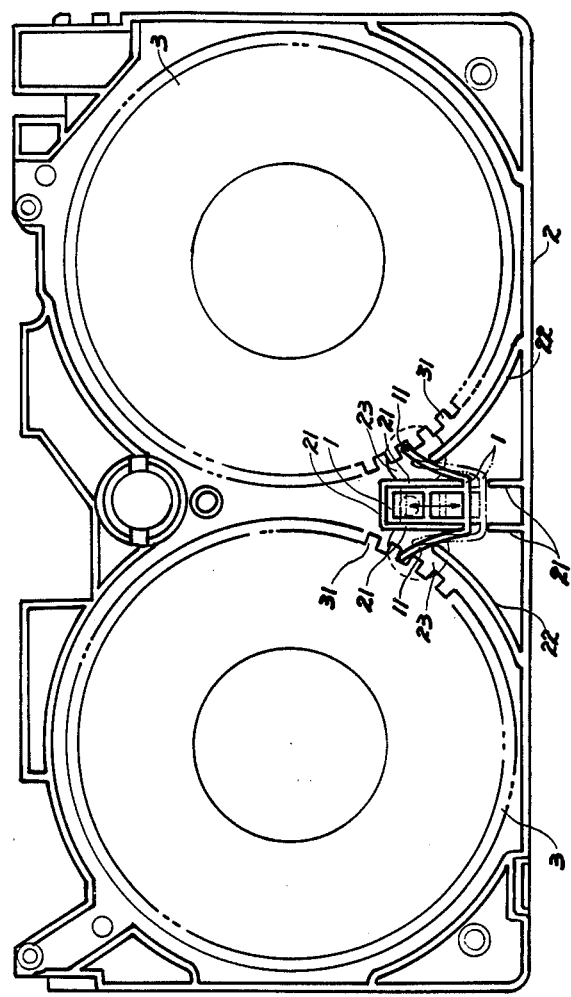
FIG. 6 is a top view showing the movement between the lower cover and the locking base.

FIG. 6 shows the double-winged locking base 1 assembled with a lower cassette cover 2. The locking base 1 is fixed between two guiding walls 21 that are set in parallel at the middle inside of the back wall of the lower cover 2. The guiding walls 21 are as high as the locking base 1. Slots 211 (see FIG. 4) are formed in the guiding walls 21 and face each other, thereby enabling the locking base 1 mounted in the slots 211 between the two guiding walls 21 to move smoothly without obstructing back movement of the fixing wings 11. In addition, at the two sides of the parallel guiding walls 21 are positioned two supporting walls 22 which respectively support the fixing wings 11 so as to stop the tape wheels solidly while the locking base 1 stays at its normal locking position.

A hole 23 is bored in the lower cover 2 between each of the guiding walls 21 and each of the supporting walls 22 for each projection 111 of the fixing wings 11 to sit in, enabling the front edge of the fixing wings 11 to exactly lock in one of the serration notches of the wheels 3. A hole 24 bored in the bottom of the lower cover 2 between the two guiding walls 21 permits passage therethrough of the lifting rod 5 of a tape recorder or a rewinder.

Figure 5:
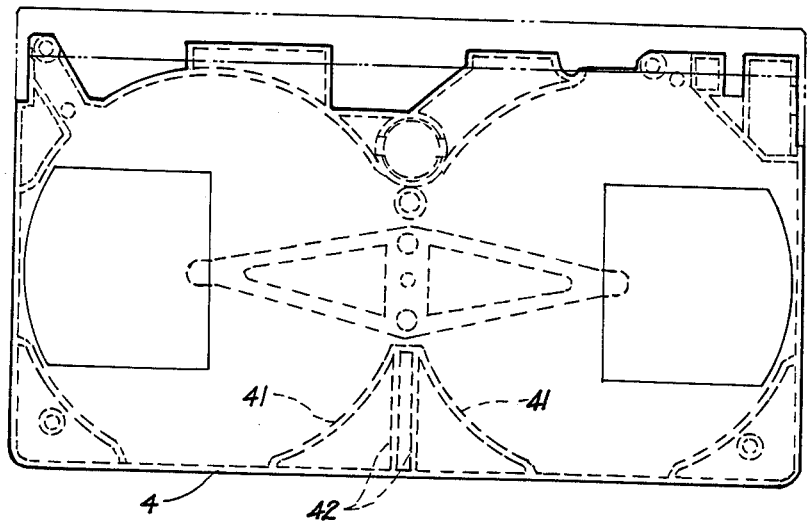
FIG. 5 is a top view of the upper cover of a tape cassette used with this invention.

An upper cover 4 to be mounted on the lower cover 2, as shown in FIG. 5, has two curved walls 41 set on the inner side of its back wall. The curved walls overlie the supporting walls 22 of the lower cover 2. Two fixing walls 42 are set between the curved walls 41 in parallel and having a shorter distance between them than the width of the locking base 1 so that when the lower and upper covers 2, 4 are connected together, the parallel fixing walls 42 touch exactly the upper edge of the locking base 1 enabling the locking base 1 to be confined and to move to and fro between the guiding walls 21 of the lower cover 2.

Next, the action of the locking base 1 is explained as follows.

As a tape cassette is put into a recorder or a rewinder, the lifting rod 5 of the recorder or the rewinder will rise into the hole 24 of the lower cover 2 and push back the locking base 1 along the slope of the front bottom edge of the locking base 1. Meanwhile, the fixing wings 11 of the locking base 1, because of the backward movement of the locking base 1 and the pushing by the supporting walls 22, will move backward and additionally inward as well so that they can slip off the serration notch 31 of the wheels, which can then rotate freely.

When the tape cassette is ejected out, the locking base 1, because of not being pushed by the lifting rod 5 of the recorder, will immediately return by its inherent resilience back to its normal position and mesh in one of the serration notches 31 of the wheels 3 via the projections of the fixing wings 11.

The advantages of the invention are listed as follows.
1. Replacing the conventional complicated parts with a simple part.
2. Directly carrying out locking and releasing actions.
3. Simple structure, low cost, easy assembling and very low percentage of malfunctioning.
4. Simplicity in manufacturing with flexible and elastic plastics by means of one mold and long life in use.
5. Meeting the requirements of mass production and rapid assembly.
6. High precision in its performance, accurate in its quality and effective promotion in its production technology.

Generally speaking, this invention possesses not only excellent practical functional and commercial value but also promotes the efficacy and the quality of a video tape cassette.

What is claimed is:

1. A brake for a tape cassette of the type including
(A) a cassette housing having an access hole through which a push rod is displaceable along a rod axis, said housing having front and rear cassette walls, and
(B) two tape reels on which a tape is wound, said reels being mounted in the housing for rotation about respective reel axes parallel to the rod axis, each reel having teeth at an outer periphery thereof, said brake comprising:
(a) a one-piece lock member mounted in the housing for sliding movement along a transverse direction extending intermediate the reels and perpendicular to said axes between a normally locked, idle position in which the reels are prevented from rotating, and a released, use position in which the reels are free to rotate, said lock member including
(i) an inclined front wall facing the front cassette wall and situated above the access hole of the housing, said inclined front wall being drivingly engaged by the push rod entering the access hole to slide the lock member to the use position,
(ii) a rear wall facing the rear cassette wall, and
(iii) a pair of flexible, resiliently deformable, cantilever arms extending from the rear wall generally toward, but terminating short of, the front wall, said arms having outer ends engageable with the teeth on the reels in the locked position;
(b) means in the housing for guiding the lock member along said transverse direction during said sliding movement;
(c) supporting means in the housing supportably bearing against the flexible, deformable arms, and operative for flexing and deforming the arms during sliding movement of the lock member toward the use position, and for reinforcing the arms in the locked position; and
(d) said lock member being returnable to the locked position upon exiting of the push rod from the access hole by reason of the flexed and deformed arms pushing against the supporting means.

2. The brake according to claim 1, wherein each cantilever arm extends along a curved course in the locked position.

3. The brake according to claim 1, wherein each outer end of the arms has a locking projection meshingly engaging a respective tooth in the locked position, and wherein the housing has clearance holes adjacent each locking projection to provide clearance for the same during said sliding movement.

4. The brake according to claim 1, wherein the one-piece lock member is formed of a synthetic plastic material having a return memory.

5. The brake according to claim 1, wherein the lock member has side walls interconnecting the front and rear walls, and wherein the cantilever arms are situated outwardly of the side walls and are integrally connected to opposite sides of the rear wall.

6. The brake according to claim 1, wherein the guiding means includes a pair of upright guide walls spaced apart to define therebetween a slide channel along which the lock member is mounted, each guide wall having a slot through which a respective cantilever arm extends.

7. The brake according to claim 6, wherein the supporting means includes a pair of upright support walls spaced outwardly apart of the guide walls to define a passage through which a respective cantilever arm extends.

8. The brake according to claim 7, wherein the support walls and the guide walls have a common height dimension.

9. The brake according to claim 6, wherein the guiding means includes a pair of upright confining walls above the guide walls and engaging the lock member from above the same, said confining walls being spaced apart by a distance less than the width of the lock member.

* * * * *